United States Patent Office 3,193,390
Patented July 6, 1965

3,193,390
PRODUCTION OF YEASTS
Alfred Champagnat and Jean Filosa, Paris, France, assignors to The British Petroleum Company Limited, London, England, a British joint-stock corporation
No Drawing. Filed Aug. 15, 1961, Ser. No. 131,470
Claims priority, application Great Britain, Aug. 22, 1960, 28,961/60
18 Claims. (Cl. 99—96)

The production of food yeasts for cattle and sometimes for human consumption starting from carbohydrates (molasses, wood hydrolysis sugars and paper-making lyes) is well known. The carbohydrates are the sole source of carbon for the development of the microorganisms used.

The replacement of carbohydrates by hydrocarbons for the production of yeasts has hitherto been studied only on the theoretical plane, starting from pure hydrocarbons or mixtures of synthetic paraffin hydrocarbons, and no consideration has been given to the development of an industrial process.

The object of the present invention is to provide an industrial process for the manufacture of food yeasts starting from petroleum fractions.

According to the present invention there is provided a process for the production of food yeast which comprises maintaining a yeast in a nutrient medium in the presence of a paraffinic feedstock of petroleum origin and a free oxygen-containing gas, preferably air, under conditions favouring growth of the yeast, said feedstock having an average molecular weight corresponding to at least 10 carbon atoms per molecule and separating the yeast from the aqueous medium.

The process may be carried out continuously or batchwise.

While the feedstock will be rich in paraffinic hydrocarbons and is preferably rich in normal paraffins, said feedstock may also contain minor amounts of other hydrocarbons, particularly naphthenes or aromatics; in general these hydrocarbons will not take part in the growth process and will be present in the product. If desired, an initial feedstock containing substantial amounts of paraffins together with other hydrocarbons may be treated for the separation of a paraffinic feedstock for use in the process of this invention. Thus there may be used straight run fractions for example kerosines; gas oils; middle distillate fractions, preferably boiling in the range 150–450° C. Alternatively, there may be used treated fractions, for example slack wax or other wax fractions, for example as are derived by the dewaxing of lubricating oil fractions; and paraffins derived by processes of separation by the use of molecular sieves.

In general the paraffinic feedstock will not require special treatment to adapt it for use in the process of the invention and in general there may be used low value fractions available as by-products of normal refinery operations.

Preferably the yeast which is grown on the paraffinic feedstock is of the family Cryptococcaceae and particularly of the sub-family Cryptococcoideae; however if desired thereby may be used, for example ascosporogeneous yeasts of the sub-family Saccharomycoideae. Preferred genera of the Cryptococcoideae sub-family are Torulopsis (also known as Torula) and Candida. Preferred strains of Candida are *Candida tropicalis* and, in particular, *Candida lipolytica* (also known as *Mycotorula lipolytica*).

When starting with a fresh stock of the yeast it will usually be necessary to adapt the yeast to assimilate carbon from hydrocarbons and to use an inoculum of the adapted yeast for the process of growth according to the invention. However these yeasts, when cultivated on an aqueous mineral medium containing the appropriate nutrient elements grow with difficult because the petroleum fractions do not contain the growth factors which exist in molasses and wood hydrolysis sugars, for example.

The growth of the yeasts used is favoured by the addition to the culture medium of a very small proportion of extract of yeast (an industrial product rich in vitamins of group B obtained by the hydrolysis of a yeast) or more generally of vitamins of group B. This quantity is preferably of the order of 25 parts per million with reference to the aqueous fermentation medium. It can be higher or lower according to the conditions chosen for the growth.

The growth of the yeast takes place at the expense of the petroleum fraction with the intermediate production of bodies having an acid function, principally fatty acids, in such manner that the pH of the aqueous mineral medium progressively diminishes. If one does not correct it the growth is fairly rapidly arrested and the concentration of the yeast in the medium, or cellular density, no longer increases so that there is reached a so-called stationary phase.

Preferably therefore the aqueous nutrient medium is maintained at a desired pH by the step-wise or continuous addition of an aqueous medium of high pH value. Clearly it is necessary to avoid damage to the yeast by these additions and hence the use of very strongly alkaline solutions should be avoided and vigorous stirring should be used to disperse "pockets" of high alkalinity in the nutrient medium. Usually, and in particular when using *Candida lipolytica*, the pH of the nutrient medium will be maintained in the range 3–6 and preferably in the range 3.5–4.5. Suitable alkaline materials for addition to the growth mixture include sodium hydroxide, potassium hydroxide and disodium hydrogen phosphate.

The optimum temperature of the growth mixture will vary according to the type of yeast employed and will usually lie in the range 25–35° C. When using *Candida lipolytica* the preferred temperature range is 28–32° C.

The take-up of oxygen is essential for the growth of the yeast. In order to maintain a rapid rate of growth the air, used to provide oxygen, should be present in the form of fine bubbles under the action of stirring. The air may be introduced through a sintered surface. Preferably however there is used the system of intimate aeration known as "vortex aeration." Usually there will be used a paddle stirrer operation at about 2000 revs/min.

It has been found that by the use of yeast of the strain *Candida lipolytica* in a process according to the invention in which aeration is effected by "vortex aeration," a high growth rate is achieved whereby the generation time lies in the range 2–5 hours and the cell concentration is increased by a factor of up to 12 g./liter in two days.

Usually it will be desirable to have present in the growth mixture a small quantity of an anti-foaming agent. In a batchwise process it is desirable to make the addition of this agent step-wise during the growth period since, in general, less anti-foaming agent will be required overall than will be the case if the agent is added in a single step.

Suitably, silicone anti-foaming agents will be used, for example at an overall proportion of 0.1% by weight of the aqueous medium.

The yeast will be separated from the growth medium by any suitable means. If desired this may be achieved by centrifuging. It will usually be desired to remove the major part of any residue of hydrocarbons retained on the yeast. As described in copending U.S. application S.N. 131,471, filed August 15, 1961 this may be accomplished by adding to the growth mixture, at the end of the growth period, a small amount of a surface active agent and, after centrifuging, treating the yeast by repeated water washing and centrifuging. In some cases it may be preferable to add the surface active agent, in the form of an emulsifying agent, at the commencement of the growth period.

The recovered yeast will usually be dried in order to bring it to a state in which it is biologically stable. Conventional drying methods used in the production of baker's yeast may be employed.

Although this invention has been described herein with particular reference to batchwise operation of the growth stage it will be apparent that in large scale operation there will be considerable advantage to be gained by continuous operation. In particular, by continuous operation an induction period at the commencement of growth can be reduced or eliminated. As previously stated the operation of the growth stage under continuous conditions lies within the scope of this invention.

The following examples illustrate the invention without limiting its scope.

EXAMPLE 1

Preparation of the inoculum

One starts with a strain of *Candida lipolytica* previously grown on malt agar medium which must first of all be adapted to assimilate carbon from the hydrocarbons. To this end, a culture of *Candida lipolytica* is made in 250 ml. sterile Erlenmeyer flasks containing 50 ml. of mineral medium to which is added $\frac{1}{10}$ ml. of n-hexadecane. The mineral medium has the following compositions:

| | |
|---|---|
| Mono-potassium phosphate _____grams__ | 7 |
| Magnesium sulphate _____do____ | 0.2 |
| Sodium chloride _____do____ | 0.1 |
| Ammonium chloride _____do____ | 2.5 |
| Tap water (oligo-elements) _____ml__ | 100 |
| Yeast extract, Difco _____milligram__ | 1 |

Distilled water balance to 1000 ml.

This culture is incubated for three days with mechanical agitation at 30° C.

5 ml. of this culture are then removed and added to another flask containing the same quantities of the same mineral medium and hydrocarbon. The incubation is carried on for three days with agitation. The same operations are conducted several times, for example, four or five. Two 2-litre toxin-sterile flasks, each containing a litre of the above mineral medium to which has been added 2 ml. of n-hexadecane, are seeded with 20 ml. per litre of an inoculum prepared by the preceding culture. This culture is incubated for 36 hours at 30° C. with mechanical agitation. The 2 litres of culture are centrifuged at 30° C. and the yeasts collected constitute the inoculum necessary for use in the process of the invention.

Culture of Candida lipolytica on a paraffinic petroleum product

The hydrocarbon feedstock utilised is the crude paraffinic product obtained by the de-waxing of a spindle oil obtained from a Kuwait crude petroleum.

Its properties are:

| | |
|---|---|
| Melting point (A.S.T.M. D127) _____° C__ | 42.8 |
| Kinematic viscosity at 100° C_____centistokes__ | 3.02 |
| Oil content (A.S.T.M. D721) _____percent__ | 17.85 |

One milligram/litre of yeast extract "Difco" is added to the same mineral nutrient medium as described above. The pH is adjusted to 5 at the beginning of the process. 290 ml. of the mineral medium containing the yeast extract are placed in a glass vessel of one litre equipped with an effective air injection device. The injection of air is started at the rate of 400 litres/hour and the temperature is maintained at 30° C., evaporation being compensated for by periodic addition of distilled water.

The yeast inoculum is added to the vessel and is maintained in suspension, whereupon the above paraffinic product is introduced by successive additions of 1 ml./hr. At the beginning the cellular density of the yeasts or concentration is 2 grams/litre expressed in dry weight. By periodic removals of 25 ml., one measures the evolution of the cellular density of the culture. To this end, the yeast cells in the samples taken are filtered and washed until ammonium ions have disappeared, and dried, and then their nitrogen content is measured by the method of Kjeldahl. Measurements on pure and dried *Candida lipolytica* previously carried out indicate that its content of nitrogen is 7.25%. From the nitrogen content of the sample taken one can deduce the cellular density of the culture at the moment of sampling. It has been found that the growth, as expressed by the increase of the cellular density, continues for about 9 hours, at the end of which one reaches a so-called stationary phase. At this moment, the cellular density is 3.5 grams/litre of the culture medium. The production of yeast per litre of medium and per hour is then $$\frac{3.5-2}{9} = 0.164 \text{ gram/litre/hour} = 164 \text{ grams/cu. metre/hour}$$

EXAMPLE 2

Growth was carried out in exactly the same manner as Example 1. The culture of *Candida lipolytica* at the beginning of the fermentation had a cellular density of 1.60 g. of yeast per litre of medium by dry weight and a pH of 5. After 8 hours, approaching the stationary phase and with the pH having fallen to 3, the pH was adjusted to 5 by the addition of caustic soda lye. The growth then commenced again and was continued for the following 5 hours until a cellular density of 6 grams/litre was reached.

The production of yeast per litre of culture medium per hour was $$\frac{6-1.6}{8+5} = 0.44 \text{ gram/litre/hour}$$

that is, 440 grams/cu. metre/hour. The yeast was recovered in the following manner:

To each 1000 parts by weight of the emulsion formed then was added 0.25 part by weight of the cationic surface active agent stearyl trimethyl ammonium chloride. The pH was adjusted to 8 by the addition of caustic soda lye and the emulsion centrifuged to give:

(a) A pasty phase of yeast cells impregnated with hydrocarbons and with aqueous medium.
(b) A clear phase of aqueous mineral medium.
(c) A wet hydrocarbon phase.

The pasty phase containing yeast cells was washed with water containing 0.25 part per 1,000 of the same surface active agent. Two washings and centrifugings were sufficient to obtain yeasts free from hydrocarbons. A final wash with pure water at 60° C. was carried out to eliminate surface active agent remaining in the yeast.

The product so obtained was heated to 80° C.–90° C. in a rapid current of air and ground to a powder.

According to another aspect of the present invention there is provided a yeast of the strain *Candida lipolytica* which has been adapted to assimilate carbon from a paraffinic feedstock of petroleum origin, said feedstock having an average molecular weight corresponding to at least 10 carbon atoms per molecule.

We claim:

1. A process for the production of food yeast which comprises maintaining a straight chain paraffinic hydrocarbon-consuming yeast in a nutrient medium in the presence of feedstock of petroleum origin selected from the group consisting of wax fractions derived by dewaxing of lubricating oil fractions, slack wax and paraffinic feedstocks obtained from petroleum fractions by molecular sieve separation and a free oxygen-containing gas under conditions favoring growth of the yeast, said feedstock having an average molecular weight corresponding to at least 10 carbon atoms per molecule, and separating the yeast from the aqueous medium.

2. A process as specified in claim 1 in which the yeast is of the family Cryptococcaceae.

3. A process as specified in claim 2 in which the yeast is of the sub-family Cryptococcoideae.

4. A process as specified in claim 3 in which the yeast is of the genus Torulopsis.

5. A process as specified in claim 3 in which the yeast is of the genus Candida.

6. A process as specified in claim 5 in which the yeast is *Candida lipolytica*.

7. A process as specified in claim 1 in which the yeast is grown in the presence of a nutrient medium containing vitamins of group B.

8. A process as specified in claim 1 in which the yeast is grown in the presence of a nutrient medium containing extract of yeast.

9. A process as specified in claim 1 in which the pH of the nutrient medium lies in the range 3.5–4.5.

10. A process as specified in claim 1 in which the pH of the nutrient medium is maintained at a desired value by the addition of an aqueous material of high pH during growth of the yeast.

11. A process as specified in claim 1 in which aeration of the yeast is effected by vortex aeration.

12. A process as specified in claim 1 in which the nutrient medium contains an anti-foaming agent.

13. A process as specified in claim 1 in which the yeast is separated as a paste and is thereafter dried.

14. A process as specified in claim 1 in which the paraffinic feedstock is a straight run fraction of petroleum.

15. A process as specified in claim 1 in which the paraffinic feedstock is a wax fraction obtained by the dewaxing of a lubricating oil fraction.

16. A process as specified in claim 1 in which the wax fraction is a slack wax.

17. A process as specified in claim 1 in which the paraffinic feedstock is obtained from a petroleum fraction by molecular sieve separation.

18. A process as specified in claim 1 in which the free oxygen-containing gas is air.

References Cited by the Examiner

Cook: "The Chemistry and Biology of Yeasts," Academic Press Inc., New York 1958, pages 275–281.

Wickerham et al.: Carbon Assimilation Tests for the Classification of Yeasts, Journal of Bacteriology 56, 1948, pages 363–371.

A. LOUIS MONACELL, *Primary Examiner*.
ABRAHAM H. WINKELSTEIN, *Examiner*.